United States Patent [19]

Steelman et al.

[11] Patent Number: 5,759,470
[45] Date of Patent: Jun. 2, 1998

[54] METHOD FOR CREATING EMBEDDED CROSSOVER PATTERN BASELAYER

[75] Inventors: Michael L. Steelman, Fayetteville; Calvin Wayne Long, Tullahoma; Lonnie Wayne Ables, Flintville, all of Tenn.

[73] Assignee: The United States of America as represented by the Secretary of the Army, Washington, D.C.

[21] Appl. No.: 834,613

[22] Filed: Apr. 14, 1997

[51] Int. Cl.$^6$ .................................................. B65H 81/00
[52] U.S. Cl. ............................ 264/236; 156/169; 242/159; 264/1.1; 264/1.24; 264/347; 264/319
[58] Field of Search ........................ 264/1.1, 1.24, 264/1.28, 103, 236, 347, 319, 320; 242/159, 18 R, 118, 118.4; 156/169

[56] References Cited

U.S. PATENT DOCUMENTS

| | | | |
|---|---|---|---|
| 4,746,080 | 5/1988 | Pinson | 242/159 |
| 5,029,960 | 7/1991 | Hulderman et al. | 242/159 |
| 5,067,665 | 11/1991 | Lo Stracco et al. | 242/118.4 |
| 5,211,789 | 5/1993 | Christian et al. | 242/159 |

*Primary Examiner*—Mathieu D. Vargot
*Attorney, Agent, or Firm*—Hugh P. Nicholson; Freddie M. Bush; Hay Kyung Chang

[57] ABSTRACT

The invented methods provide a means for reducing or eliminating manual adjustments that are required during the fabrication (winding) of fiber optic dispensers. This reduction is accomplished through the use of a fiber placement pattern that is permanently generated on the bobbin winding surface. Filaments, such as optical fibers, are precisely guided during the winding of subsequent filament layers by the embedded crossover pattern baselayer. The embedded crossover pattern baselayer is generated by first winding in a given direction a wire of a pre-selected diameter upon the polymer coating on the bobbin surface. The polymer is allowed to cure partially before the wire is unwound and removed. Afterwards a pre-selected optical fiber is wound in the direction opposite that of the wire winding direction thereby creating crossover patterns which are, then, manually adjusted to be in desired locations on the bobbin axis. The optical fiber is removed and the polymer is allowed to cure to a rigid, noncompliant state, thereby generating the embedded crossover pattern baselayer.

5 Claims, 4 Drawing Sheets

METHOD FOR CREATING EMBEDDED CROSSOVER PATTERN BASELAYER

DEDICATORY CLAUSE

The invention described herein may be manufactured, used and licensed by or for the Government for governmental purposes without the payment to us of any royalties thereon.

BACKGROUND OF THE INVENTION

In conventional methods for producing fiber optic dispensers, an initial layer of optical fiber is typically wound in a left-handed direction with each successive optical fiber layer being wound on the bobbin in an axial winding direction that is reversed from that of the preceding layer while continuing in the same circumferential direction around the bobbin. As a result of the reversal of the axial winding direction of each sequential layer after the first, the optical fiber is unable completely to follow in the grooves generated by the closely spaced fiber of the preceding layer. Each optical fiber filament must therefore skip or cross over into adjacent grooves of the preceding layer as illustrated in FIG. 1. One skip or crossover in the opposite direction from the previous layer returns the optical fiber filament to its same groove location with one turn of the bobbin. Two crossovers are required to advance the fiber one groove in the opposite direction to the laydown of the previous layer.

When the two crossovers in each of the many adjacent turns are aligned together with their corresponding crossovers, they typically form two independent crossover patterns which extend from one end of the dispenser surface to the other. In the course of conventional fiber optic dispenser fabrication, these crossover patterns are manually adjusted to specific desired locations on the dispenser surface and into a specific geometrical pattern, such as a smooth spiral or straight line along the axis of the bobbin, as depicted in FIG. 2.

In the making of fiber optic dispensers, it has been shown to be necessary to have baselayers. These baselayers are typically formed on a bobbin by creating a surface of helical parallel grooves that are sized appropriately for the optical fiber to be wound thereon. Prior art techniques for creating baselayers include the winding of a layer of precision diameter metallic wire in a left-handed direction, profile shown in FIG. 3. This technique produces shallow parallel grooves between adjacent turns of the wire. But these grooves do not provide an optimum guide for the optical fiber winding process and result rather in reduced stability for the completed fiber optic dispenser. The first layer of optical fiber is wound directly into the parallel grooves (also in a left-handed direction) and crossover patterns are generated on all subsequent layers as the axial winding direction is reversed for each successive layer.

Hulderman et al. disclosed a method for fabricating a compliant baselayer in U.S. Pat. No. 5,029,960 (Jul. 9, 1991). In this method, a bobbin is coated with a highly compliant material which is allowed to cure completely. Optical fiber is then wound onto the compliant material where it deforms the compliant surface because of the winding tension of the fiber. The fiber is wound in a left-handed direction and crossover patterns occur on all layers after the first.

Another conventional technique for baselayer fabrication consists of applying a coating of epoxy enamel (or similar material) to the surface of a bobbin and impressing a left-handed parallel winding pattern into the uncured enamel surface. FIG. 4 shows the resulting concave grooves that act as a guide and provide support to the fiber layer. As with the wire baselayer and compliant baselayer, the first layer of optical fiber is wound in a left-handed direction into the parallel grooves and crossovers occur on all following layers.

Usually, however, the crossover patterns generated by the three baselayer fabrication methods described above will not be parallel with the bobbin axis as desired and may spiral around the bobbin. Jagged crossover pattern regions may be evident along with small skips that can cause winding irregularities in subsequent layers if left uncorrected. Correction of crossover patterns is usually accomplished manually by manipulation of the patterns in a technique called dressing, massaging or racking. This is a time-consuming process that significantly increases the labor involved in fabricating fiber optic dispensers. In addition, the required mechanical contact with the fiber during the manipulation of the crossover patterns can disrupt the adhesive used as a binder for the dispenser and may damage the fragile optical fiber.

SUMMARY OF THE INVENTION

The embedded crossover pattern baselayer is generated by reversing the winding direction that is normally used in impressing the baselayer grooves on the uncured epoxy polymer coating of a bobbin. After the polymer is partially cured with the imprint of the baselayer grooves, a layer of optical fiber is wound in the opposite direction from that of the baselayer grooves. As a result of this winding direction reversal, crossover patterns are forced to form in the very first layer of optical fiber. The crossover patterns are, then, manually adjusted to the desired location on the bobbin. Thereafter, the optical fiber is removed and the epoxy polymer, now having the embedded crossover pattern thereon, is allowed to cure completely to a rigid state. When such crossover patterns are present, there is a tendency for crossover patterns formed by optical fiber filaments undergoing laydown to follow the impressed crossover patterns. Subsequent crossover patterns track the underlying patterns, thereby drastically reducing or eliminating altogether the manual adjustments required to place the crossover patterns at specific preferred locations. This significantly reduces the fabrication time required for fiber optic dispensers.

DESCRIPTION OF THE PREFERRED EMBODIMENT

Figure 1:
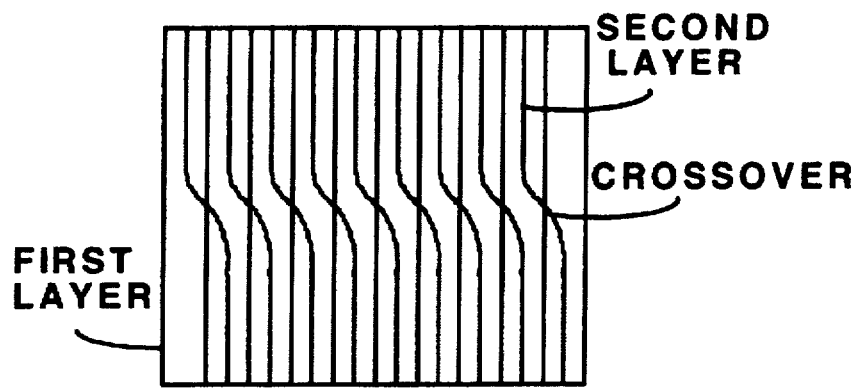
FIG. 1 illustrates the crossover that must occur when a layer of optical fiber is wound on top of the first layer in the conventional method of producing fiber optic dispensers.
Figure 3:
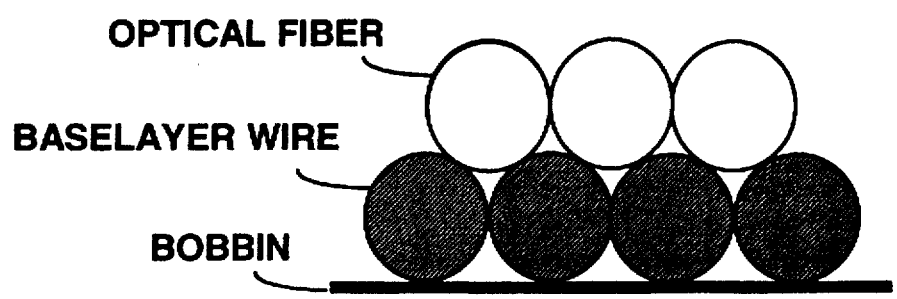
FIG. 3 illustrates the profile of metallic wire wound to serve as baselayer.
Figure 4:
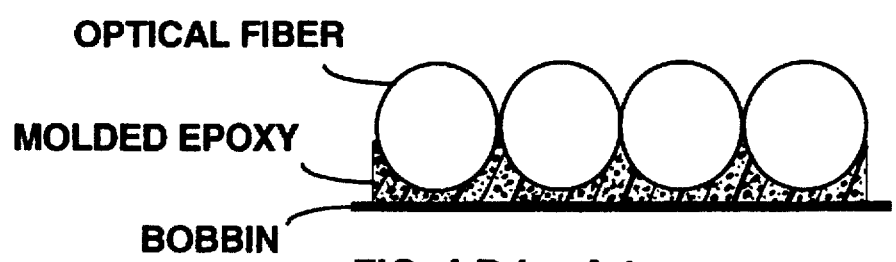
FIG. 4 shows the concave grooves that are formed in the epoxy enamel surface by the wound optical fiber.
Figure 2:
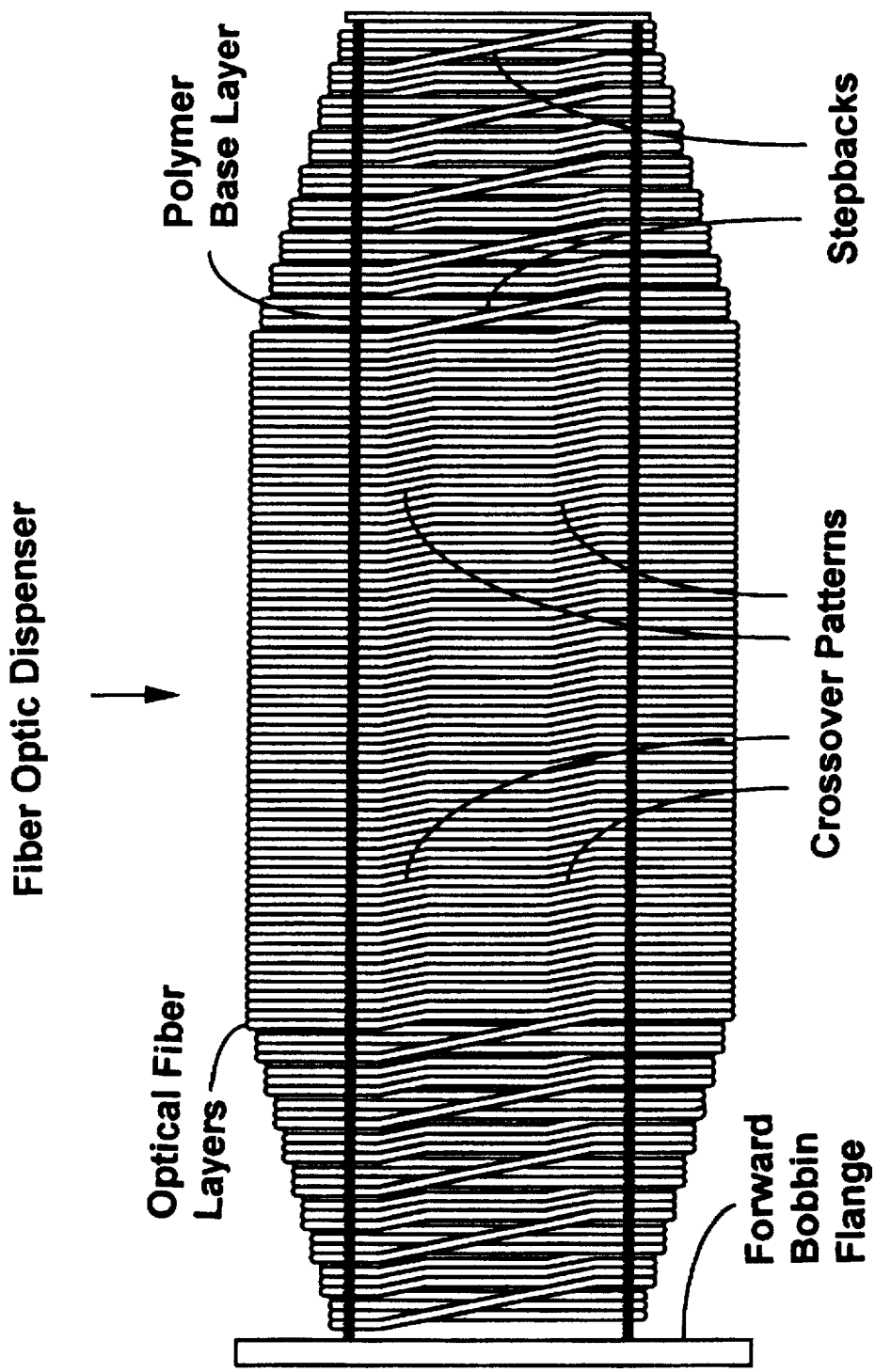
FIG. 2 is a depiction of a desired geometrical pattern formed by crossover patterns.

Referring now to the drawing wherein like numbers represent like parts in each of the several figures, the process for generating the embedded crossover pattern baselayer is explained.

The embedded crossover pattern baselayer can be created in a number of ways by using various polymer materials and impressing filaments. Two embodiments are described below.

Figure 5:
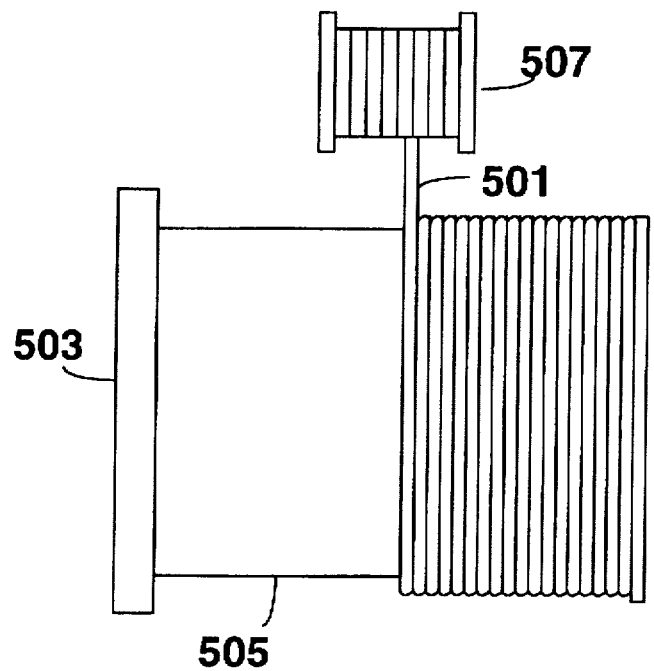
FIG. 5 illllustrates the winding of wire in the right-handed direction to create grooves in the epoxy polymer.
Figure 6:
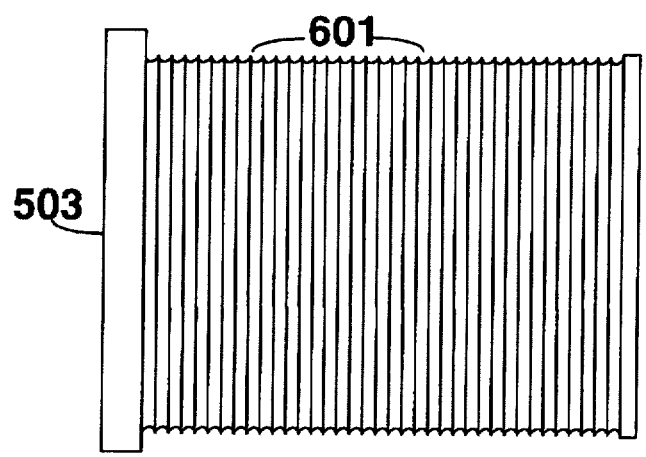
FIG. 6 shows the right-hand threaded grooves.

In the first and preferred embodiment, as the initial step, the bobbin, on which the optical fiber is to be wound, is coated with a pre-selected epoxy polymer to a desired uniform thickness. The polymer baselayer material can be composed of a thermoset (curing) material or a thermoplastic material which may be heated to a softening point to allow generation of the grooved impressions. In addition, solvents may be used to soften a polymer surface sufficiently prior to impression. Klenk's Tub & Tile Epoxy Enamel is found to be a suitable polymer material. Onto this polymer surface 505, stainless steel wire 501 from wire spool 507 is wound in a right-handed direction looking at the rear of bobbin 503 (the conventional direction is left-handed), as is illustrated in FIG. 5. As the stainless steel wire is wound onto the flat polymer surface, the wire pushes the polymer material out from under itself. This forms valleys underneath the wire and peaks to the sides of the wire. If the polymer layer is too thick or too pliant, too much of the polymer may be forced from underneath the wire and it will attempt to force the adjacent wire turns away from one another, thereby causing unacceptable discontinuities in the finished groove pattern. For a typical optical fiber having a diameter of 250 micrometers, the baselayer polymer thickness should be between 25 to 35 micrometers. After the wire layer is completely wound, the polymer is allowed to cure partially to a soft, non-tacky state. Upon reaching this state, wire 501 is carefully unwound back onto wire spool 507, leaving right-hand threaded grooves 601 on the surface of the bobbin as shown in FIG. 6. The baselayer thus formed is sometimes referred to as a reverse pitch baselayer. The parallel grooves contain no skips or irregularities that would produce flaws during subsequent winding processes.

Figure 7:
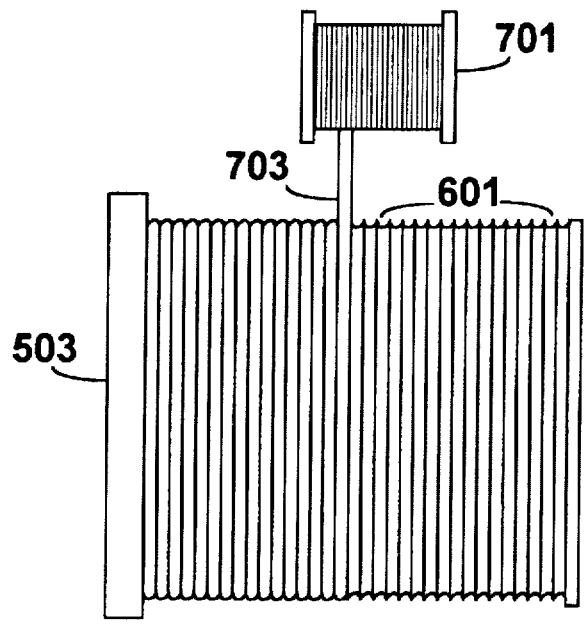
FIG. 7 depicts the impression of embedded crossover pattern onto the polymer.
Figure 8:
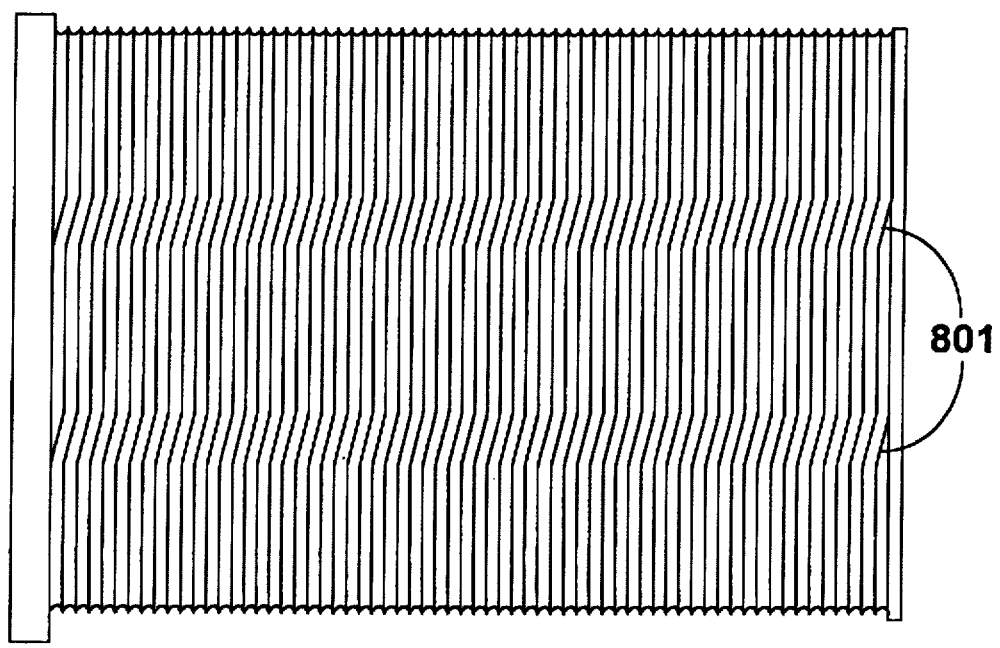
FIG. 8 shows the emergent crossover patterns.

The second step involves the impression of the embedded crossover pattern as depicted in FIG. 7. A length of optical fiber 703 is unspooled from fiber spool 701 and wound onto the reverse pitch grooves 601 in a left-handed direction at a tension of approximately 115 grams-force. During the winding process, optical fiber 703 attempts to follow grooves 601. But since the direction of the baselayer grooves is opposite that of the winding direction of the optical fiber, the optical fiber is required to cross over two groove peaks with each rotation of bobbin 503. A crossover point forms each time a groove peak is traversed and the crossover patterns 801 are generated as the winding continues across the length of the bobbin. Upon conclusion of the winding of the first layer of optical fiber 703, the emergent crossover patterns are manually manipulated to place them in locations that are parallel to the axis of the bobbin and at typical separation distances of 2–3 inches between the patterns. The crossing over of the optical fiber eventually causes a deformation of the groove peak in the location of the crossover pattern with the resulting grooves as shown in FIG. 8. To augment the capability of the optical fiber to impress a crossover pattern, a second layer of the optical fiber may be wound on top of the first layer at a tension of 160 grams-force. The baselayer is then allowed to cure to a rigid state (non-compliant) and afterwards optical fiber 703 is removed, thus revealing the embedded crossover pattern baselayer.

An examination of the embedded crossover pattern baselayer microscopically revealed a flattening of the groove peaks for a slight distance (0.3–0.5 inches) along the ridges in the crossover area. This can be envisioned as a short slanting valley joining two parallel adjacent valleys.

An alternate embodiment entails a modification to the second step described above. Instead of winding a layer of optical fiber onto the reverse pitch grooves to form the crossover patterns, the modification involves utilizing a sanding block to remove the groove peaks in two 0.4 inch-wide paths along the axis of the bobbin to provide points for ease of cross over to the consecutive groove. Optical fiber is then wound onto the baselayer and crossover patterns are reliably generated in the sanded regions and in subsequent layers.

Although this alternate method for embedded crossover pattern baselayer fabrication is less labor-intensive than the preferred embodiment, there are certain disadvantages. The alternate method produces crossover regions which do not fully support the optical fiber as it transitions from one groove to the other as does the preferred embodiment. The removal of groove peaks over a longer than required region around the circumference of the bobbin can allow small gaps in fiber spacing to occur in the crossover regions. With a fiber optic dispenser consisting of many layers (greater than 25) of optical fiber or a dispenser that will undergo extreme temperature exposure, these small gaps could cause stability problems. The groove peak removal can be more precisely accomplished in a machining operation but the optimum groove shape cannot be feasibly fabricated. For these reasons, the first-described method is the preferred embodiment of a method for generating embedded crossover pattern baselayer.

The embedded crossover pattern baselayer methods can be used with bobbins of various materials including aluminum, graphite composite and fiber glass. The methods have applications in military fiber optic communication links that require the rapid deployment of optical fiber such as Non-Line of Sight (NLOS) and Enhanced Fiber Optic Guided Missile (EFOG-M). The methods can also be used in the fabrication of fiber optic gyro coils which can be precision-wound and would benefit from a reduction or elimination of manual manipulation of crossover patterns required during winding.

The utilization of the invented methods can bring about significant potential improvement in winding speed, efficiency, process automation and repeatability. In addition, the use of the methods has been shown to be less sensitive than conventional methods to characteristics of adhesives used as binders during the winding process. Silicone adhesives provide excessive lubrication and tend to make crossover patterns unstable by allowing undesired movement of the patterns due to the minimized surface friction. The invented methods eliminate this instability. Wire baselayers produce a groove depth of approximately 15% of the fiber diameter compared to about 30% depth for the compliant baselayer. The invented methods produce a depth of approximately 50% of the fiber diameter, resulting in the optimum stability. Due to the compliancy properties of the compliant baselayer, the bottom layer may be forced into compression which is prevented by the use of a rigid baselayer such as is produced by the invented methods. The embedded crossover pattern baselayer fully supports the first layer of the optical fiber and eliminates the Hertzian behavior exhibited by the first layer thereby resulting in lower internal fiber stresses and decreased optical loss.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A method for fabricating an embedded crossover pattern baselayer on a bobbin suitable for winding an optical fiber thereon, said method comprising the steps of:

a) coating the bobbin with a pre-selected polymer;

b) allowing the polymer to achieve a partial cure;

c) wrapping a wire in a right-handed direction around the partially cured polymer, the wire having a predetermined diameter;

d) curing the polymer to a soft, non-tacky state;

e) taking off the wire to generate a reverse pitch baselayer on the polymer;

f) winding a first layer of the optical fiber upon the reverse pitch baselayer in a left-handed direction, thereby generating the crossover patterns;

g) manipulating the crossover patterns so as to place them in locations parallel to the axis of the bobbin;

h) allowing the baselayer on the polymer to cure to a rigid state; and i) removing the optical fiber to reveal the embedded crossover pattern baselayer.

2. A method for fabricating an embedded crossover pattern baselayer on a bobbin as set forth in claim 1, wherein said coating step entails coating the bobbin with epoxy to a uniform thickness of between 25 to 35 micrometers for optical fiber having a diameter of 250 micrometers.

3. A method for fabricating as set forth in claim 2, wherein said winding step involves winding the optical fiber at a tension of approximately 115 grams-force.

4. A method for fabricating as set forth in claim 3, wherein the generated crossover patterns are separated from each other by a typical distance of 2–3 inches.

5. A method for fabricating as set forth in claim 4, wherein said method further comprises, after the manipulating step, a step of winding a second layer of optical fiber on top of the first layer at a tension of 160 grams-force to augment the capability of the optical fiber to impress a crossover pattern on the polymer.

* * * * *